United States Patent
Kumabe et al.

(10) Patent No.: US 10,365,109 B2
(45) Date of Patent: Jul. 30, 2019

(54) TRAVEL DISTANCE ESTIMATION DEVICE (71) Applicant: DENSO CORPORATION, Kariya, Aichi-pref. (JP)

(72) Inventors: Seigou Kumabe, Kariya (JP); Kojiro Takeyama, Nagakute (JP); Yoshiko Kojima, Nagakute (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 156 days.

(21) Appl. No.: 15/313,596

(22) PCT Filed: May 25, 2015

(86) PCT No.: PCT/JP2015/002632
§ 371 (c)(1),
(2) Date: Nov. 23, 2016

(87) PCT Pub. No.: WO2015/186309
PCT Pub. Date: Dec. 10, 2015

(65) Prior Publication Data
US 2017/0184403 A1 Jun. 29, 2017

(30) Foreign Application Priority Data
Jun. 4, 2014 (JP) ................................ 2014-115954

(51) Int. Cl.
G01C 21/04 (2006.01)
G01C 21/16 (2006.01)
(Continued)

(52) U.S. Cl.
CPC ........... G01C 21/16 (2013.01); G01C 21/165 (2013.01); G01C 22/00 (2013.01); G01C 22/02 (2013.01);
(Continued)

(58) Field of Classification Search
CPC ........ G01C 21/16; G01C 21/10; G01C 21/12; G01C 21/14; G01C 21/165; G01C 21/18;
(Continued)

(56) References Cited

U.S. PATENT DOCUMENTS

| 5,928,309 A * | 7/1999 | Korver ................ G01C 21/165 342/359 |
| 6,421,622 B1 * | 7/2002 | Horton .................. G01C 21/16 701/11 |

(Continued)

FOREIGN PATENT DOCUMENTS

| EP | 1731873 A2 | 12/2006 |
| JP | H09196691 A | 7/1997 |

(Continued)

*Primary Examiner* — Richard A Goldman
(74) *Attorney, Agent, or Firm* — Harness, Dickey & Pierce, P.L.C.

(57) ABSTRACT

A travel distance estimation device is provided. The travel distance estimation device includes an estimated velocity determination unit that successively estimates an estimated velocity of a movable object based on an acceleration integrated value and a velocity initial value a travel distance calculation unit that successively calculates an estimated travel distance of the movable object based on the estimated velocity, and a past velocity correction unit that determines corrected past velocities by correcting pre-correction past estimated velocities so that the corrected past velocities are continuous with the velocity initial value determined this time. The pre-corrected past estimated velocities are the estimated velocities that were successively determined. The travel distance estimation device further includes a travel distance correction unit that recalculates based on the corrected past velocities an estimated travel distance.

8 Claims, 7 Drawing Sheets

(51) Int. Cl.
*G01C 22/00* (2006.01)
*G01C 22/02* (2006.01)
*G01S 19/40* (2010.01)
*G01S 19/49* (2010.01)
*G01S 19/51* (2010.01)
*G01S 19/39* (2010.01)
*G01S 19/42* (2010.01)
*G01S 19/45* (2010.01)
*G01S 19/48* (2010.01)
*G01C 21/10* (2006.01)
*G01C 21/12* (2006.01)
*G01C 21/14* (2006.01)
*G01S 19/38* (2010.01)

(52) U.S. Cl.
CPC .............. *G01S 19/39* (2013.01); *G01S 19/40* (2013.01); *G01S 19/421* (2013.01); *G01S 19/45* (2013.01); *G01S 19/48* (2013.01); *G01S 19/49* (2013.01); *G01S 19/51* (2013.01); *G01C 21/10* (2013.01); *G01C 21/12* (2013.01); *G01C 21/14* (2013.01); *G01S 19/38* (2013.01); *G01S 19/42* (2013.01)

(58) Field of Classification Search
CPC ....... G01C 22/00; G01C 25/005; G01S 19/26; G01S 19/42; G01S 19/52; G01S 11/10; G01S 19/40; G01S 19/421; G01S 19/45; G01S 19/48; G01S 19/51; G01S 19/38; G01S 19/39; B60W 2420/90; B60W 2420/905
USPC ................ 701/500, 472, 29.2, 30.7
See application file for complete search history.

(56) References Cited

U.S. PATENT DOCUMENTS

| | | | | |
|---|---|---|---|---|
| 6,449,559 B2 * | 9/2002 | Lin | ...................... | G01C 21/165 342/357.31 |
| 7,193,559 B2 * | 3/2007 | Ford | ..................... | G01C 21/165 342/357.32 |
| 7,239,949 B2 * | 7/2007 | Lu | ......................... | B60G 17/018 280/5.502 |
| 8,666,589 B2 * | 3/2014 | Munnix | ................. | B60W 40/10 701/30.2 |
| 9,494,428 B2 * | 11/2016 | Mizuochi | ............... | G01C 21/16 |
| 9,650,039 B2 * | 5/2017 | Hocking | ............... | B60W 30/02 |
| 9,846,174 B2 * | 12/2017 | Schwartz | ................ | G01P 13/02 |
| 9,886,040 B1 * | 2/2018 | Kelly | .................... | G05D 1/0891 |
| 2003/0200067 A1 * | 10/2003 | Johnson | ................. | G01C 21/16 703/2 |
| 2003/0216865 A1 * | 11/2003 | Riewe | ................... | G01C 21/165 701/470 |
| 2005/0065727 A1 * | 3/2005 | Hu | ........................ | G01C 21/165 700/213 |
| 2005/0212698 A1 * | 9/2005 | Barron | ..................... | G01S 19/24 342/357.59 |
| 2005/0234644 A1 * | 10/2005 | Lin | ........................ | G01C 21/005 701/470 |
| 2007/0213889 A1 * | 9/2007 | Parra Carque | ........... | G01C 3/08 701/7 |
| 2008/0091351 A1 * | 4/2008 | Hoshizaki | ............ | G01C 21/165 701/478.5 |
| 2011/0235686 A1 * | 9/2011 | Kojima | ................. | G01S 19/426 375/141 |
| 2011/0246020 A1 * | 10/2011 | Munnix | ................. | B60W 40/10 701/29.2 |
| 2015/0362320 A1 * | 12/2015 | Garrett | ................... | G01C 21/02 701/510 |
| 2016/0327654 A1 * | 11/2016 | Kumabe | ................. | G01S 19/52 |
| 2017/0184403 A1 * | 6/2017 | Kumabe | ................. | G01C 21/16 |

FOREIGN PATENT DOCUMENTS

| | | |
|---|---|---|
| JP | 2011209268 A | 10/2011 |
| JP | 2012042318 A | 3/2012 |
| JP | 2013113789 A | 6/2013 |
| JP | 2015129714 A | 7/2015 |
| WO | WO-2015104757 A1 | 7/2015 |

* cited by examiner

TRAVEL DISTANCE ESTIMATION DEVICE

CROSS-REFERENCE TO RELATED APPLICATIONS

This application is a U.S. National Phase Application under 35 U.S.C. 371 of International Application No. PCT/JP2015/002632 filed on May 25, 2015 and published in Japanese as WO 2015/186309 A1 on Dec. 10, 2015. This application is based on and claims the benefit of priority from Japanese Patent Application No. 2014-115954 filed on Jun. 4, 2014. The entire disclosures of all of the above applications are incorporated herein by reference.

TECHNICAL FIELD

The present disclosure relates to a travel distance estimation device that estimates a travel distance of a movable object, in particular to a technology of improving the estimation accuracy of the travel distance.

BACKGROUND ART

A travel distance of a movable object is used together with a traveling direction, for estimating a traveling trajectory, for example. If a traveling trajectory can be estimated, a relative position, which is relative to a position at a certain point of time, can be determined. Even when a radio wave for positioning transmitted by a satellite positioning system including a GPS or the like cannot be received, it is possible to estimate a current position based the past measured position and a traveling trajectory.

A travel distance can be calculated by the product of a velocity and a time. As a method of estimating a velocity of a movable object, Patent Literature 1 discloses a technology of: measuring an acceleration and then calculating a velocity from the acceleration; and additionally calculating a velocity also from a Doppler shift amount of a GPS carrier wave (hereunder a Doppler velocity). In Patent Literature 1, a velocity calculated from an acceleration is corrected successively by a Doppler velocity.

A velocity calculated from an acceleration can be renewed in a short cycle but is more likely to cause an error than a Doppler velocity. Consequently, a velocity calculated from an acceleration is corrected successively by a Doppler velocity. A velocity of good accuracy can be obtained by the correction.

An advantage of the technology according to Patent Literature 1 is that wiring for obtaining a signal of a vehicle velocity sensor is unnecessary when the technology is applied to a vehicle.

Patent Literature 2 discloses a technology of estimating a velocity vector of a vehicle with a high degree of accuracy. Concretely, in the technology according to Patent Literature 2, an expression showing a relationship among a satellite direction vehicle velocity, a tire wheel velocity, a line-of-sight vector from a vehicle to a satellite in a positioning system, a vehicle orientation, and a clock drift is used for estimating a velocity vector. The expression is an expression formed by modifying an expression showing a relationship among a satellite direction velocity, a line-of-sight vector, a velocity vector, and a clock drift by using a constraint condition. The constraint condition comprises the condition that a velocity vector is constrained by a velocity and a yaw rate of a movable object and the condition that the time variation of a clock drift is linear.

PRIOR ART LITERATURE

Patent Literature

Patent Literature 1: JP2012-42318A
Patent Literature 2: JP2013-113789A

SUMMARY OF INVENTION

The present inventors have found the followings regarding the above background art. The technology of Patent Literature 2 requires a tire wheel velocity. The technology of Patent Literature 2 therefore cannot be applied to a velocity estimation device that cannot be connected to a tire wheel velocity sensor.

In the technology of Patent Literature 1 in contrast, a velocity is calculated from an acceleration detected by an acceleration sensor equipped in an own device and hence the device is not required to be connected to a tire wheel velocity sensor.

Since a sensor has a phenomenon called drift as it is widely known, the error of a value detected by a sensor diverges with the lapse of time. For that reason, in the technology of Patent Literature 1, a velocity calculated from an acceleration is corrected by a Doppler velocity.

Even when a velocity calculated from an acceleration is corrected successively by such a velocity as a Doppler velocity having better accuracy than the velocity calculated from the acceleration however, a travel distance is calculated by the product of a velocity calculated from an acceleration and a time during a time from when the velocity calculated from the acceleration is corrected and to when the velocity is corrected next. Since a velocity error increases during using a velocity calculated from an acceleration, the error of a travel distance also increases cumulatively. The estimation accuracy of a travel distance therefore has not been sufficiently good.

The present disclosure is made in view of the above circumstances and an object of the present disclosure is to provide a travel distance estimation device capable of estimating a travel distance with a higher degree of accuracy.

A travel distance estimation device of an example of the present disclosure comprises: a traveling direction acceleration determination unit that successively determines a traveling direction acceleration, which is a traveling direction component of a detection value of an acceleration sensor moving together with a movable object; an integration processing unit that successively calculates an acceleration integrated value by integrating the traveling direction accelerations determined by the traveling direction acceleration determination unit; an initial setting value determination unit that determines, as a velocity initial value of the movable object, a velocity of the movable object calculated based on a Doppler shift amount from a satellite of a satellite positioning system or a velocity of the movable object at a time of stoppage of the movable object; an estimated velocity determination unit that successively estimates an estimated velocity of the movable object based on the acceleration integrated value calculated by the integration processing unit and the velocity initial value determined by the initial setting value determination unit; a travel distance calculation unit that successively calculates an estimated travel distance of the movable object based on the estimated velocity determined by the estimated velocity determination unit and a time; a past velocity correction unit that, upon determining the velocity initial value by the initial setting value determination unit, determines corrected past velocities by correcting pre-correction past estimated velocities so that the corrected past velocities are continuous with the velocity initial value determined this time, wherein the pre-corrected past estimated velocities are the estimated velocities that were successively determined by the estimated velocity determination unit during a time period from when the velocity initial value was determined by the initial setting value determination unit the previous time until the velocity initial value is determined by the initial setting value determination unit this time; and a travel distance correction unit that, upon determining the corrected past velocities by the past velocity correction unit, recalculates based on the corrected past velocities and the time period an estimated travel distance during the time period from when the velocity initial value was determined by the initial setting value determination unit the previous time until the velocity initial value is determined by the initial setting value determination unit this time.

According to this travel distance estimation device, the initial value setting unit determines, as the velocity initial value of the movable object, the velocity of the movable object calculated based on the Doppler shift amount of the radio wave from the satellite of the satellite positioning system or the velocity of the movable object at the time of stoppage of the movable object. Because the velocity of the movable object calculated based on the Doppler shift amount of the radio wave from the satellite and the velocity of the movable object at the time of stoppage can be determined with a high degree of accuracy, the velocity initial value therefore represents the velocity of the movable object at the time when the velocity initial value is determined with a high degree of accuracy.

Then the estimated velocity is estimated by using the velocity initial value and the acceleration integrated value. After the velocity initial value is renewed therefore, the accuracy of the estimated velocity having deteriorated due to the cumulative error of the acceleration integrated value improves.

In the travel distance estimation device in addition, when the initial setting value determination unit determines the velocity initial value, the corrected past velocities are determined by correcting the pre-correction past estimated velocities so that the corrected past velocities are continuous with the velocity initial value determined this time. The pre-correction past estimated velocities are the estimated velocities after the velocity initial value was determined the previous time until the velocity initial value is determined this time. As a result, the accuracy of the past estimated velocities having deteriorated due to the cumulative error of the acceleration integrated value also improves. Then when the corrected past velocities are determined, the estimated travel distance after the velocity initial value was determined previous time until the velocity initial value is determined this time is recalculated by using the corrected past velocities. As a result, the accuracy of the estimated travel distance having deteriorated due to the deterioration of the accuracy of the past estimated velocities also improves.

BRIEF DESCRIPTION OF THE DRAWINGS

The above and other objects, features, and advantages on the present disclosure will be more apparent from the following detailed description made with reference to the accompanying drawings. In the attached drawings.

DESCRIPTION OF EMBODIMENTS

<Configuration of Embodiment>

Figure 1:
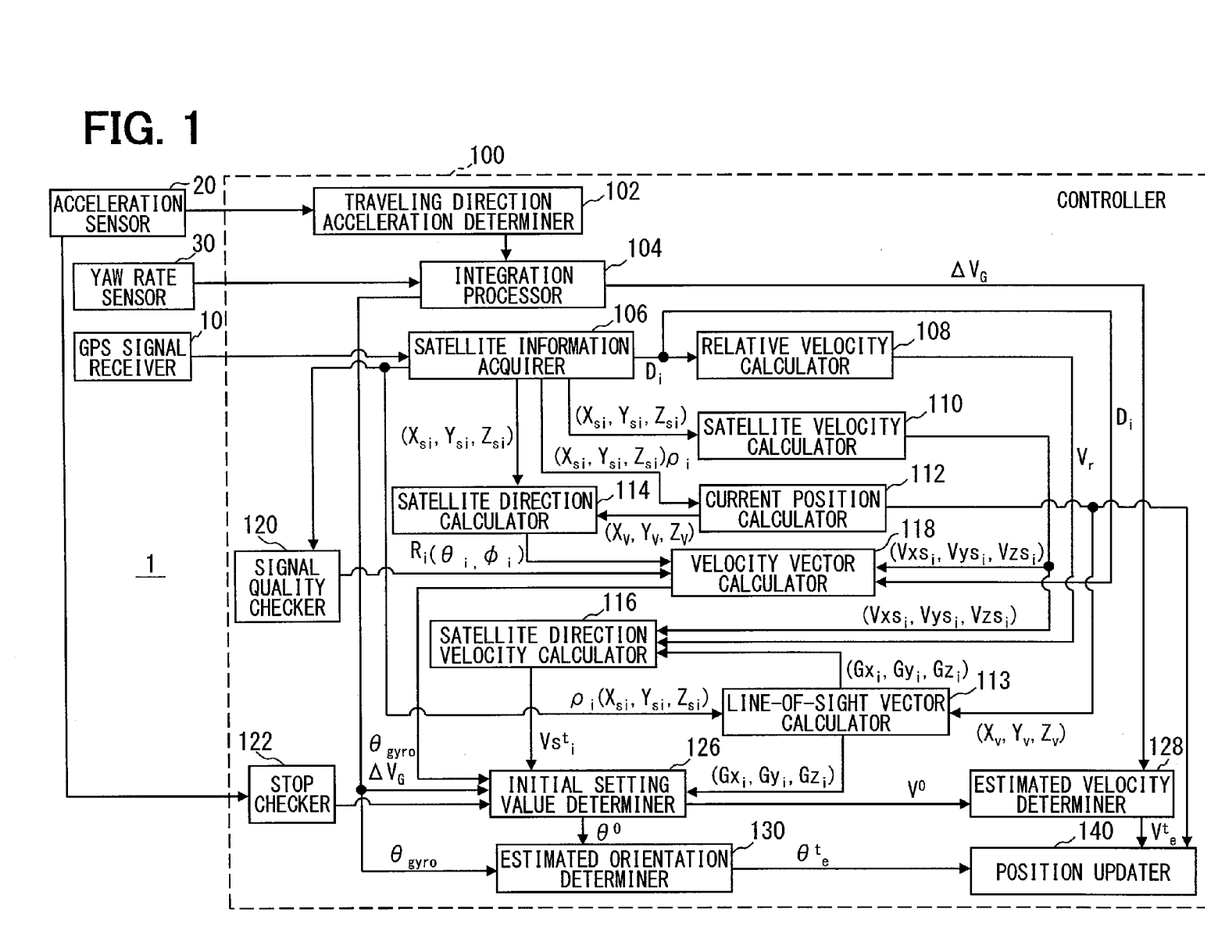
FIG. 1 is a configuration diagram of a current position estimation device according to an embodiment.

An embodiment is explained hereunder in reference to drawings. A current position estimation device 1 shown in FIG. 1 is an example of a travel distance estimation device. The current position estimation device 1 includes a GPS signal reception unit 10, an acceleration sensor 20, a yaw rate sensor 30, and a control unit 100 and is mounted on a vehicle not shown in the drawings.

The GPS signal reception unit 10 is a receiver that receives GPS radio waves transmitted by a GPS satellite included in a global positioning system (hereunder, GPS) that is one of satellite positioning systems. The GPS radio waves mean waves formed by superimposing a GPS signal over carrier waves. The GPS signal reception unit 10 extracts a GPS signal by demodulating received GPS radio waves and sends it to the control unit 100. Further, carrier waves and a received signal strength are also sent to the control unit 100. The GPS signal corresponds to an example of a satellite signal.

As is well known, a plurality of GPS satellites exist. The GPS signal reception unit 10 receives all of the GPS radio waves receivable from GPS satellites. A GPS signal includes the satellite number of a GPS satellite, an ephemeris which is trajectory information of a GPS satellite, the time when a GPS satellite transmits radio waves, and the like.

The acceleration sensor 20 is a triaxial acceleration sensor and the orientation of the acceleration sensor 20 is fixed so that the z axis may be parallel with the vertical direction of a vehicle, the x axis may be parallel with the width direction of the vehicle, and the y axis may be parallel with the anteroposterior direction of the vehicle. Here, an acceleration sensor that detects the accelerations along two axes of the x axis and the y axis may be used instead of the triaxial acceleration sensor. The acceleration sensor 20 sends the detected values of accelerations along the respective axes to the control unit 100.

The yaw rate sensor 30 detects a rotational angular velocity around the vertical axis of a vehicle passing through the yaw rate sensor 30, namely a yaw rate. Then the detected yaw rate is supplied to the control unit 100. Here, the vertical axis of a vehicle is an axis vertical to a vehicle interior floor of the vehicle and is an axis parallel with the zenith direction when the vehicle is located on a horizontal ground.

The control unit 100: is a computer equipped with a CPU, a ROM, a RAM, and others; and functions as the respective units 102 to 140 shown in FIG. 1 by having the CPU carry out a program stored in the ROM while the temporary memory function of the RAM is used.

A traveling direction acceleration determination unit 102 determines a traveling direction acceleration of a vehicle from a detection value of the acceleration sensor 20. As stated earlier, the acceleration sensor 20 is fixed to a vehicle in the predetermined orientation and the y axis is directed to the vehicle traveling direction. As a result, the y axis detection value of the acceleration sensor 20 is extracted as the traveling direction acceleration.

An integration processing unit 104 successively integrates traveling direction accelerations determined by the traveling direction acceleration determination unit 102, namely values of the y axis detected by the acceleration sensor 20. The integrated value is hereunder called an acceleration integrated value $\Delta V_G$. Further, the integration processing unit 104 integrates values detected by the yaw rate sensor 30 and calculates a relative azimuth $\theta^t_{gyro}$. The relative azimuth $\theta^t_{gyro}$ is a relative azimuth, which is the azimuth at time t relative to the traveling orientation of a vehicle at a base point of time. The relative azimuth $\theta^t_{gyro}$ is calculated from the expression (1). In the expression (1), $\Delta t$ is a time step and $\omega^{t'}$ is a value detected by the yaw rate sensor 30 at the time t.

[Num 1]

$$\theta^t_{gyro} = \Delta t \sum_{t'=0}^{t} \omega^{t'} \quad (1)$$

Here, the value detected by the acceleration sensor 20 and the value detected by the yaw rate sensor 30 for calculating the acceleration integrated value $\Delta V_G$ and the relative azimuth $\theta^t_{gyro}$ respectively are acquired at the same timing. The timing of the acquisition is at a certain period of time or at the time of traveling a certain distance, for example.

A satellite information acquisition unit 106 acquires a GPS signal and a carrier wave from the GPS signal reception unit 10. When the GPS signal reception unit 10 receives GPS radio waves from a plurality of GPS satellites, the satellite information acquisition unit 106 acquires the GPS signals and carrier waves on all of the GPS satellites from which the GPS signal reception unit 10 receives the GPS radio waves. The satellite information acquisition unit 106 is an example of a satellite signal acquisition unit.

Further, the satellite information acquisition unit 106 also calculates a positional coordinate $(X_{si}, Y_{si}, Z_{si})$, a pseudo distance $\rho_i$, and a Doppler shift amount $D_i$ of a GPS satellite i, those being information on the GPS satellite i obtained from the GPS signals and the carrier waves.

A positional coordinate $(X_{si}, Y_{si}, Z_{si})$ of a GPS satellite i is calculated based on the ephemeris of the GPS satellite i and the time when a radio wave is transmitted. A pseudo distance $\rho_i$ is calculated by multiplying the velocity of light by the time difference between the time when a GPS satellite i transmits a GPS radio wave and the time when the GPS signal reception unit 10 receives the GPS radio wave, namely the radio wave propagation time.

The Doppler shift amount $D_i$ is a frequency difference between the frequency of a carrier wave of a radio wave transmitted by a GPS satellite i and the frequency of a carrier wave of a received GPS radio wave. The carrier wave frequency of a radio wave transmitted from a GPS satellite is predetermined and the frequency is stored beforehand in a predetermined memory unit such as a memory unit, not shown in the drawings, included in the control unit 100. The satellite information acquisition unit 106 therefore acquires the frequency of a carrier wave of a GPS radio wave from the memory unit and calculates a Doppler shift amount $D_i$ from the frequency and the frequency of a carrier wave acquired from the GPS signal reception unit 10. Here, the frequency of a carrier wave acquired by the satellite information acquisition unit 106 is determined by a known frequency analysis method, for example by fast Fourier transformation.

A relative velocity calculation unit 108 calculates a relative velocity $Vr_i$ of a vehicle to a GPS satellite i based on a Doppler shift amount $D_i$ calculated by the satellite information acquisition unit 106. The relative velocity $Vr_i$ is calculated from the following expression (2). In the expression (2), $Vr_i$ is a relative velocity of a vehicle to a GPS satellite i, $D_i$ is a Doppler shift amount calculated by the satellite information acquisition unit 106, C is the velocity of light, and F is a frequency of a carrier wave of a radio wave transmitted from a GPS satellite.

[Num 2]

$$Vr_i = -D_i \cdot C/F \quad (2)$$

A satellite velocity calculation unit 110 calculates a velocity vector, namely a three-dimensional velocity $Vxs_i$, $Vys_i$, and $Vzs_i$, of a GPS satellite i from time-series data of a positional coordinate $(X_{si}, Y_{si}, Z_{si})$ of the GPS satellite i calculated by the satellite information acquisition unit 106 by a known method of using differential of the Kepler's equation.

A current position calculation unit 112 calculates a current position $(X_v, Y_v, Z_v)$ of a vehicle by using a pseudo distance $\rho_i$ of a GPS satellite i calculated by the satellite information acquisition unit 106.

In the event of positioning using a GPS signal, a current position $(X_v, Y_v, Z_v)$ of a vehicle is calculated based on a positional coordinate $(X_{si}, Y_{si}, Z_{si})$ of a GPS satellite i and a pseudo distance $\rho_i$ from the GPS satellite in accordance with the principle of triangulation. Here, a true distance $r_i$ to a GPS satellite i is represented by the expression (3). Meanwhile, the pseudo distance $\rho_i$ is represented by the expression (4). In the expression (4) here, s is a distance error caused by time error.

[Num 3]

$$r_i = \sqrt{(X_{si}-X_v)^2+(Y_{si}-Y_v)^2+(Z_{si}-Z_v)^2} \quad (3)$$

$$\rho_i = r_i + s \quad (4)$$

From the expressions (3) and (4), a current position $(X_v, Y_v, Z_v)$ of a vehicle can be calculated by solving the following simultaneous equations (5) obtained from pseudo distances $\rho_i$ of four or more GPS satellites.

[Num 4]

$$\begin{cases} \rho_1 = \sqrt{(X_{s1}-X_v)^2+(Y_{s1}-Y_v)^2+(Z_{s1}-Z_v)^2} + s \\ \rho_2 = \sqrt{(X_{s2}-X_v)^2+(Y_{s2}-Y_v)^2+(Z_{s2}-Z_v)^2} + s \\ \vdots \\ \rho_N = \sqrt{(X_{sN}-X_v)^2+(Y_{sN}-Yv)^2+(Z_{sN}-Z_v)^2} + s \end{cases} \quad (5)$$

Here, in the present embodiment, a current position $(X_v, Y_v, Z_v)$ of a vehicle is used as a final current position, and also is used for obtaining the direction of a GPS satellite i, namely an angle between the GPS satellite and the vehicle in a satellite direction calculation unit 114 that will be described later.

Since a GPS satellite is in the distance, the accuracy of a current position used for obtaining an angle between a GPS satellite and a vehicle may be low. Further, a current position of a vehicle can be obtained also from an estimated travel distance $L^t_e$ or a corrected travel distance $L^t_{co}$ and an estimated orientation $\theta^t_e$, the details being described later.

Consequently, there is no need to determine a current position always by using a pseudo distances $\rho_i$ and the current position $(X_v, Y_v, Z_v)$ of a vehicle may be determined by a method of a low accuracy other than the method of determining a position by using a pseudo distances $\rho_i$. Although it depends on estimation accuracy allowed in a system or the like, as long as the positional error of a vehicle is within the range of several hundred meters, the velocity estimation error is not more than 1 m/sec and the error is not a major problem. As a result, for example, a position may be determined from a map or the like or a current position $(X_v, Y_v, Z_v)$ of a vehicle may be determined from past measurement history of a position or information of a beacon or the like. Further, in the case of determining a current position by using a pseudo distances $\rho_i$ too, there is no need to calculate the pseudo distances $\rho_i$ from a GPS radio wave of good signal quality. A judgment criterion for good signal quality will be explained in the explanation of a signal quality judgment unit 120.

A line-of-sight vector calculation unit 113 calculates a line-of-sight vector $(Gx_i, Gy_i, Gz_i)$ from a vehicle to a GPS satellite i. The x component, y component, and z component of a line-of-sight vector are calculated from the expression (6).

[Num 5]

$$Gx^t_i = \frac{1}{\rho^t_i}(X^t_{st} - X^t_v),\ Gy^t_i = \frac{1}{\rho^t_i}(Y^t_{st} - Y^t_v),\ Gz^t_i = \frac{1}{\rho^t_i}(Z^t_{st} - Z^t_v) \quad (6)$$

In the expression (6), $\rho^t_i$ is a pseudo distance of a GPS satellite i at time t and $(X^t_{si}, Y^t_{si}, Z^t_{si})$ is a positional coordinate of the GPS satellite i at time t. Those are calculated by the satellite information acquisition unit 106. $(X^t_v, Y^t_v, Z^t_v)$ is a current position at time t and is calculated by the current position calculation unit 112.

The satellite direction calculation unit 114 calculates a direction $R_i$ to a GPS satellite i based on a current position $(X_v, Y_v, Z_v)$ calculated by the current position calculation unit 112 and a positional coordinate $(X_{si}, Y_{si}, Z_{si})$ of the GPS satellite calculated by the satellite information acquisition unit 106. The direction $R_i$ to the GPS satellite i is represented with an elevation $\theta_i$ to the horizontal direction and an azimuth $\phi_i$ to the north direction when the GPS satellite i is viewed from a vehicle.

A satellite direction velocity calculation unit 116 calculates a satellite direction velocity $Vs_i$ that is the velocity of a vehicle in the direction to a GPS satellite i. The satellite direction velocity $Vs_i$ is calculated from the following expression (7).

[Num 6]

$$Vs^t_i = \frac{D^t_i}{f}C + Gx^t_i Vxs^t_i + Gy^t_i Vys^t_i + Gz^t_i Vzs^t_i \quad (7)$$

In the expression (7), the first term on the right side is a relative velocity Vr and is calculated by the relative velocity calculation unit 108. Gx, Gy, and Gz represent a line-of-sight vector and are calculated by the line-of-sight vector calculation unit 113. Vxs, Vys, and Vzs are the x, y, and z components of a velocity of a GPS satellite i and are calculated by the satellite velocity calculation unit 110. The first term on the right side in the expression (7) is a relative velocity $Vr_i$ of a vehicle to a GPS satellite i and the second to fourth terms represent a velocity of the GPS satellite i in the direction to the vehicle. The sum of them means the velocity of the vehicle in the direction to the GPS satellite i and hence the expression (7) can be formed.

A velocity vector calculation unit 118 calculates a velocity vector of a vehicle. When a velocity vector of a vehicle is represented by (Vx, Vy, Vz), the relationship between a satellite direction velocity $Vs_i$ and a velocity vector (Vx, Vy, Vz) of the vehicle is represented by the following expression (8).

[Num 7]

$$-Vx\cdot\cos\theta_i\cdot\sin\phi_i + Vy\cdot\cos\theta_i\cdot\cos\phi_i + Vz\cdot\sin\theta_i = Vs_i$$

$$Vr_i = -D_i\cdot C/F = Vsat_i - Vs_i + vCb$$

$$Vs_i - vCb = Vsat_i + D_i\cdot C/F \quad (8)$$

From the expression (8) obtained with respect to a GPS satellite i, a simultaneous equation represented by the following expression (9) including a velocity vector (Vx, Vy, Vz) of a vehicle and Cbv as unknown quantities is obtained.

In the expression (9), $Vsat_i$ is a velocity of a GPS satellite i in the direction to a vehicle and is obtained from $Vsat_i = R[Vxs_i, Vys_i, Vzs_i]^T$. T means transposition of a matrix. Here, the velocity $Vsat_i$ of a GPS satellite i in the direction to a vehicle may also be obtained by calculating the second to fourth terms on the right side in the expression (7). Cbv is a clock drift of a clock included in the GPS signal reception unit 10.

[Num 8]

$$\begin{pmatrix} Vsat_0 + D_0\cdot C/F \\ Vsat_1 + D_1\cdot C/F \\ \vdots \\ Vsat_N + D_N\cdot C/F \end{pmatrix} = \begin{pmatrix} -\cos\theta_0\sin\phi_0 & \cos\theta_0\cos\phi_0 & \sin\theta_0 & -1 \\ -\cos\theta_1\sin\phi_1 & \cos\theta_1\cos\phi_1 & \sin\theta_1 & -1 \\ \vdots & \vdots & \vdots & \vdots \\ -\cos\theta_N\sin\phi_N & \cos\theta_N\cos\phi_N & \sin\theta_N & -1 \end{pmatrix} \begin{pmatrix} Vx \\ Vy \\ Vz \\ Cbv \end{pmatrix} \quad (9)$$

The simultaneous equation represented by the expression (9) can be solved when the number of GPS satellites that have received GPS radio waves is four or more. Here, even when a GPS radio wave is received, the GPS radio wave that cannot be judged as a good signal quality is excluded. The velocity vector calculation unit 118 therefore calculates a velocity vector of a vehicle from the expression (9) when GPS radio waves that have been judged as good signal qualities are received from four or more GPS satellites. Whether or not a signal quality is good is judged by a signal quality judgment unit 120 that will be explained below.

The signal quality judgment unit 120 judges whether or not the signal quality of a GPS radio wave from a GPS satellite i received by the GPS signal reception unit 10 is good. Various known criteria can be used for the judgment of a signal quality.

For example, whether or not a signal quality is good is judged by the condition that S/N is not lower than a predetermined value (judgment condition 1), the condition that a residual error of a pseudo distance $\rho_i$ is not higher than a judgment standard distance (judgment condition 2), the condition that an elevation $\theta_i$ is not less than a judgment standard angle (judgment condition 3), or a combination of the judgment conditions 1 to 3 (judgment condition 4).

Here, the residual error of a pseudo distance $\rho_i$ is the difference between the distance between a positional coordinate $(X_{si}, Y_{si}, Z_{si})$ of a GPS satellite i and a current position $(X_v, Y_v, Z_v)$ of a vehicle and the pseudo distance $\rho_i$. When the residual error is large, the influence of a multipath or the like is conceivable and hence the signal quality is judged as poor. Here, in the case of the judgment condition 1, the signal quality is judged as good if S/N is not lower than a predetermined value. In the case of the judgment condition 3, the signal quality is judged as good if an elevation $\theta_i$ is not less than a judgment standard angle.

A stop judgment unit 122 judges whether or not a vehicle stops. Then when a vehicle is judged to stop, the velocity of the vehicle is set at 0 km/h. As the method of stop judgment, various kinds of known methods can be used. For example, a vehicle is judged to stop if a value on the z axis detected by the acceleration sensor 20 is not more than a stop judgment value. When a vehicle travels, there are some vertical vibrations and thus stop judgment can be done based on a detected value on the z axis. In place of a detected value on the z axis, a detected value on the y axis, the variation of a detected value on the z axis, or the variation of a detected value on the y axis may be used. When stop judgment is carried out by a value detected by the acceleration sensor 20, wiring for acquiring a brake signal or a shift position signal is advantageously unnecessary. Obviously, it is also possible to make a brake signal or a shift position signal acquired and carry out stop judgment by using such a signal.

An initial setting value determination unit 126 determines a velocity initial value $V^0$ used in an estimated velocity determination unit 128 and an orientation initial value $\theta^0$ used in an estimated orientation determination unit 130.

In the present embodiment, it is possible to calculate a velocity of a vehicle also at the already-explained velocity vector calculation unit 118. The velocity vector calculation unit 118 however cannot calculate a velocity vector (Vx, Vy, Vz) of a vehicle unless GPS radio waves having good signal qualities are received from four or more GPS satellites. In an urban area of many high-rise buildings for example therefore, a velocity vector (Vx, Vy, Vz) may not be calculated for a long period of time in some cases. Further, even in such an environment as to be able to receive four or more GPS radio waves having good signal qualities, the velocity vector calculation unit 118 can calculate a velocity vector (Vx, Vy, Vz) of a vehicle only at every constant period of 100 ms for example because the velocity vector calculation unit 118 uses a Doppler shift amount D requiring frequency analysis.

In contrast, a value detected by the acceleration sensor 20 can be obtained at a constant frequency without depending on a travel environment and moreover at every period of 20 ms for example shorter than the period at which the velocity vector calculation unit 118 can calculate a velocity vector (Vx, Vy, Vz).

A velocity is therefore estimated based on an acceleration integrated value $\Delta V_G$ from when a velocity vector (Vx, Vy, Vz) of a vehicle is calculated by the velocity vector calculation unit 118 to when a velocity vector (Vx, Vy, Vz) of the vehicle is calculated next.

Figure 2:
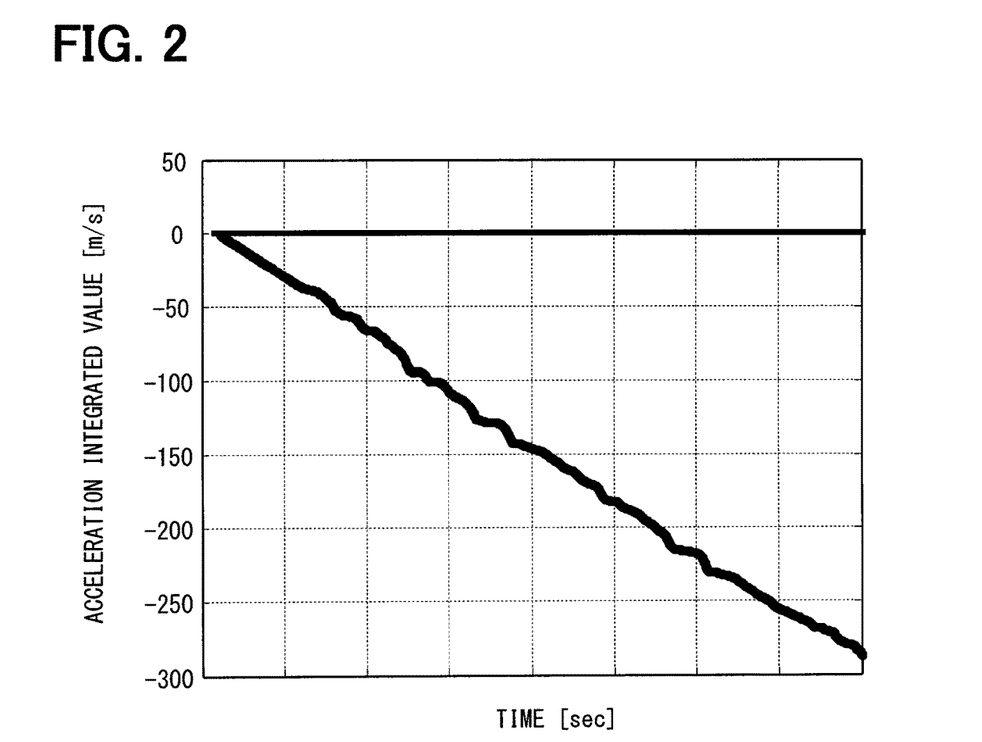
FIG. 2 is a view showing that the error of an acceleration integrated value $\Delta V_G$ diverges.

A value detected by the acceleration sensor 20 always has an error and the error diverges in nature. FIG. 2 is a graph showing the nature. FIG. 2 is a graph of an acceleration integrated value $\Delta V_G$ in a stopped state. Because a vehicle is in a stopped state, the acceleration integrated value $\Delta V_G$ in FIG. 2 means an error when the acceleration integrated value $\Delta V_G$ is directly used as a velocity. From FIG. 2, it is obvious that the error diverges with the lapse of time when the acceleration integrated value $\Delta V_G$ is directly used as a velocity. Here, although the error takes negative values in FIG. 2, the error may inversely take positive values in some cases.

In this way, when an acceleration integrated value $\Delta V_G$ is directly used as a velocity, the error diverges with the lapse of time. Consequently, at a time when a highly-accurate velocity is obtained, the highly-accurate velocity is used as a velocity initial value $V^0$.

A value obtained by subtracting an acceleration integrated value $\Delta V_G$ obtained at this time point from the highly-accurate velocity is regarded as a velocity initial value $V^0$. The velocity initial value $V^0$ obtained in this way means an offset fraction for correcting the acceleration integrated value $\Delta V_G$ into a highly-accurate velocity regarded as a true velocity. An estimated velocity Ve therefore is obtained from $\Delta V_G - V^0$.

An error between an acceleration integrated value $\Delta V_G$ and a true velocity increases with the lapse of time. Consequently, as the renewal cycle of a velocity initial value $V^0$ decreases, the estimated accuracy of a velocity using the acceleration integrated value $\Delta V_G$ improves.

In the present embodiment therefore, a velocity initial value $V^0$ is calculated from the expression (12) formed by improving the following expression (11) disclosed as a final velocity vector calculation formula in Patent Literature 2. Further, an orientation initial value $\theta^0$ is calculated at the same time.

Meanwhile, with regard to a velocity initial value $V^0$, the velocity initial value $V^0$ is determined from the expression (10) when the velocity vector calculation unit 118 can calculate a velocity vector (Vx, Vy, Vz). The reason is that the velocity vector (Vx, Vy, Vz) calculated by the velocity vector calculation unit 118 is highly accurate and hence the accuracy of a velocity initial value $V^0$ improves when the velocity initial value $V^0$ is determined by using the velocity vector (Vx, Vy, Vz). Further, when the stop judgment unit 122 judges that a vehicle stops, the velocity initial value $V^0$ is set at $-\Delta V_G$.

[Num 9]

$$V_0 = \sqrt{Vx^2 + Vy^2 + Vz^2} - \Delta V_G \tag{10}$$

$$Vs^t_i = V^t_{wheel} Gx^t_i \cos(\theta^0 + \theta^t_{gyro}) + V^t_{wheel} Gy^t_i \sin(\theta^0 + \theta^t_{gyro}) - Cbv^0 - At \tag{11}$$

$$Vs^t_i = (V^0 + \Delta V^t_G) GX^t_i \cos(\theta^0 + \theta^t_{gyro}) + V^0 + \Delta V^t_G) Gy^t_i \sin(\theta^0 + \theta^t_{gyro}) - Cbv^0 - At \tag{12}$$

In the expression (11), t is time, $V_{wheel}$ is a value detected by a tire wheel velocity sensor, $\theta^0$ is an azimuth of a vehicle in the traveling direction at initial time (hereunder an orientation initial value), $\theta_{gyro}$ is an integrated value of azimuths of a vehicle in the traveling direction, namely a relative azimuth, $Cbv^0$ is a clock drift at initial time, A is a gradient of the time variation of a clock drift, and Gx and Gy are the x component and the y component of a line-of-sight vector from a vehicle to a GPS satellite i.

Further, in the expression (12), $V^0$ is a velocity initial value being a vehicle velocity at initial time and $\Delta V_G$ is an acceleration integrated value on and after the initial time. That is, the expression (12) is an expression obtained by replacing a value $V_{wheel}$ detected by a tire wheel velocity sensor in the expression (11) with the sum of a velocity initial value $V^0$ and an acceleration integrated value $\Delta V_G$. The expression (12) corresponds to an example of a velocity estimation expression.

Firstly, a method of deriving the expression (11) is explained. As disclosed also in Patent Literature 2, the relationship between a satellite direction velocity $Vs^t_i$ and a velocity vector (Vx, Vy, Vz) of a vehicle can be represented by the expression (13).

[Num 10]

$$Vs^t_i = Gx^t_i Vx^t + Gy^t_i Vy^t + Gz^t_i Vz^t - Cbv^t \tag{13}$$

In the expression (13), there are four unknown parameters of $Vx^t$, $Vy^t$, $Vz^t$, and $Cbv^t$. The expression (11) is derived by substituting the constraint conditions 1 to 3, those being described below, into the expression (13) in Patent Literature 2 in order to reduce the number of the unknown parameters.

[Num 11]

Constraint condition 1 $\begin{cases} Vx^t = V^t_{wheel} \cos(\theta^0 + \theta^t_{gyro}) \\ Vy^t = V^t_{wheel} \sin(\theta^0 + \theta^t_{gyro}) \end{cases}$ Constraint condition 2 $Vz^t = 0$ Constraint condition 3 $Cbv^t = Cbv^0 + At$ The constraint condition 1 represents that the magnitudes of the x component and the y component of an estimated velocity vector are constrained by a tire wheel velocity and further the time variation fractions of the x component and the y component are constrained by the time variation of an azimuth. $\theta^0$ in the constraint condition 1 is an azimuth of a vehicle in the traveling direction at initial time. The constraint condition 2 represents that the variation of a velocity in the vertical direction is assumed to be always trifle.

The constraint condition 3 represents that the variation of a clock drift in a short period of time is assumed to be linear because the time variation of the clock drift is mild. $Cbv^0$ in the constraint condition 3 shows a clock drift at initial time and A shows a gradient of the time variation of the clock drift.

Here, although only the velocity components in a two-dimensional plane are constrained by time variation in the constraint conditions 1 and 2, it is also possible to constrain the z axis component by time variation by using a pitch rate obtained by a three-axis gyroscopic sensor or the like. The expression (11) is obtained by taking the constraint conditions 1 to 3 into the expression (13). Then the expression (12) is obtained by replacing a value $V_{wheel}$ detected by a tire wheel velocity sensor in the expression (11) with the sum of a velocity initial value $V^0$ and an acceleration integrated value $\Delta V_G$.

In the expression (12), the satellite direction velocity $Vs^t_i$ is a satellite direction velocity in the GPS satellite i direction at time t and is calculated by the satellite direction velocity calculation unit 116. $\Delta V^t_G$ is an acceleration integrated value at time t and is calculated by the integration processing unit 104. $(Gx^t_i, Gy^t_i, Gz^t_i)$ is a line-of-sight vector at time t and is calculated by the line-of-sight vector calculation unit 113. $\theta^t_{gyro}$ is a yaw rate integrated value and calculated by the integration processing unit 104. The unknown parameters in the expression (12) therefore are four of $\theta^0$, $Cbv^0$, A, and $V^0$.

If four expressions can be formed therefore, a velocity initial value $V^0$ and an orientation initial value $\theta^0$, those being unknown parameters, can be obtained. Moreover, the unknown parameters $\theta^0$, $Cbv^0$, A, and $V^0$ are constant at different times as long as the time is on and after initial time. As a result, four expressions are not required to be formed at the same time and the unknown parameters can be obtained as long as the number of the expressions formed at more than one time is four or more in total. For example, even when the number of observation satellites at each of four times ($t_0$, $t_1$, $t_2$, and $t_3$) is one, a velocity initial value $V^0$ and an orientation initial value $\theta^0$ can be obtained by using data from the observed GPS satellites.

Here, a velocity initial value $V^0$ is a vehicle velocity at initial time as stated earlier. Further, in the expression (12) to calculate a velocity initial value $V^0$, a satellite direction velocity Vs calculated from a Doppler shift amount D is used. It can also be said therefore that the initial setting value determination unit 126 calculates the velocity of a vehicle at initial time based on a Doppler shift amount.

The estimated velocity determination unit 128 calculates an estimated velocity $V^t_e$ successively in an acceleration acquisition cycle by adding an acceleration integrated value $\Delta V^t_G$ calculated by the integration processing unit 104 to a velocity initial value $V^0$ determined by the initial setting value determination unit 126.

The estimated orientation determination unit 130 determines an estimated orientation $\theta^t_e$ showing the traveling direction of a vehicle successively in a relative azimuth determination cycle by adding a relative azimuth $\theta^t_{gyro}$ calculated by the integration processing unit 104 to an orientation initial value $\theta^0$ determined by the initial setting value determination unit 126.

Figure 3:
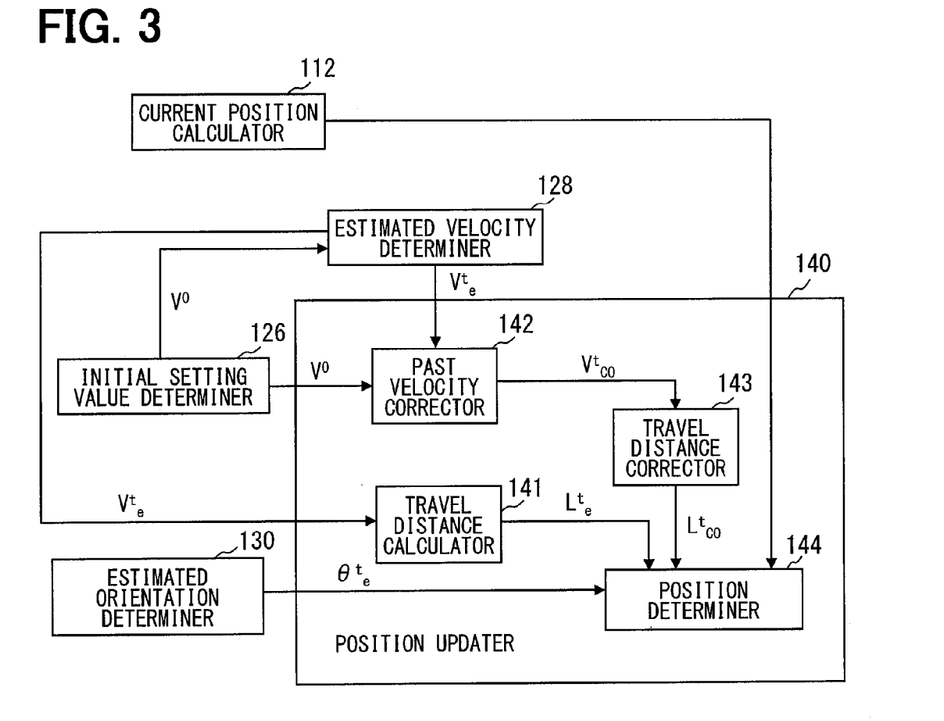
FIG. 3 is a detailed configuration diagram of a position renewal unit in FIG. 1.

A position renewal unit 140 successively renews the current position of a vehicle. A detailed configuration of the position renewal unit 140 is shown in FIG. 3. As shown in FIG. 3, the position renewal unit 140 includes a travel distance calculation unit 141, a past velocity correction unit 142, a travel distance correction unit 143, and a position determination unit 144.

The travel distance calculation unit 141 calculates a travel distance of a vehicle every time when the velocity of the vehicle is renewed. The velocity of a vehicle is renewed in an acceleration acquisition cycle. The velocity of a vehicle is determined by any one of the estimated velocity determination unit 128, the velocity vector calculation unit 118, and the stop judgment unit 122. The travel distance calculation unit 141 calculates an estimated travel distance $L^t_e$, which is an estimated value of a distance which the vehicle travels during an acceleration acquisition cycle, by multiplying the acceleration acquisition cycle by a velocity determined by any one of the estimated velocity determination unit 128, the velocity vector calculation unit 118, and the stop judgment unit 122.

Every time when the initial setting value determination unit 126 renews the velocity initial value $V^0$, the past velocity correction unit 142 corrects estimated velocities $V^t_e$ that were estimated successively by the estimated velocity determination unit 128 during a time period from when a velocity initial value $V^0$ was renewed previous time until a velocity initial value $V^0$ is renewed this time. The estimated velocity $V^t_e$ to be corrected is hereunder referred to as a pre-correction past estimated velocity $V^{t(i)}_e$. Here, i means an integer of any one of N to 0, t(N) means a time when the velocity initial value $V^0$ is renewed previous time, and t(0) means a time when the velocity initial value $V^0$ is renewed this time. Further, a value obtained by correcting a pre-correction past estimated velocity $V^{t(i)}_e$ is referred to as a corrected past velocity $V^{t(i)}_{co}$. The corrected past velocity $V^{t(i)}_{co}$ is calculated from the following expression (14).

[Num 12]

$$V_\infty^{t(i)} = V_e^{t(i)} + (V^0 - V_e^{t(0)}) \frac{t(i) - t(N)}{t(0) - t(N)} \qquad (14)$$

The velocity initial value $V^0$ can be regarded as a velocity of a good accuracy. In the expression (14) therefore, a difference $(V^0 - V^{t(0)}_e)$ between a velocity initial value $V^0$ and a pre-correction past estimated velocity $V^{t(0)}_e$ at the time when the velocity initial value $V^0$ is renewed means an error cumulated on the pre-correction past estimated velocity $V^{t(0)}_e$ until the time when the velocity initial value $V^0$ is renewed.

Then $(t(i)-t(N))/(t(0)-t(N))$ is a coefficient representing a ratio of a time period, which is a time period after a velocity initial value $V^0$ is renewed previous time until a pre-correction past estimated velocity $V^{t(i)}_e$ is estimated, to a time period $(t(0)-t(N))$, which is a time period after the velocity initial value $V^0$ is renewed previous time until the velocity initial value $V^0$ is renewed this time. In the expression (14), a difference $(V^0 - V^{t(0)}_e)$ is multiplied by the coefficient. A corrected past velocity $V^{t(i)}_{co}$ calculated from the expression (14) therefore is a value obtained by correcting a pre-correction past estimated velocity $V^{t(i)}_e$ on the assumption that the errors of the pre-correction past estimated velocities $V^{t(i)}_e$ increase linearly.

Figure 4:
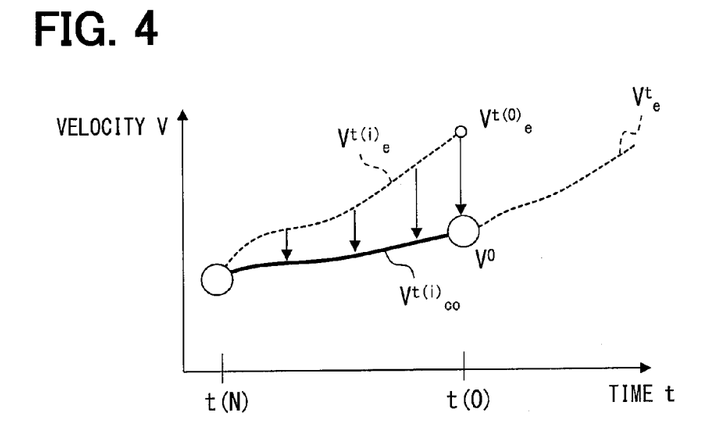
FIG. 4 is a view explaining the correction of a velocity by a past velocity correction unit in FIG. 3.

FIG. 4 is a graph showing a pre-correction past estimated velocity $V^{t(i)}_e$ and a corrected past velocity $V^{t(i)}_{co}$ comparatively. As shown in FIG. 4, at the time $t(0)$, there is a difference $(V^0 - V^{t(0)}_e)$ between a velocity initial value $V^0$ and a pre-correction past estimated velocity $V^{t(0)}_e$. The difference means an error cumulated on an estimated velocity $V^t_e$. At the time when a velocity initial value $V^0$ is renewed, the expression "estimated velocity $V^t_e$=velocity initial value $V^0$" is established. An estimated velocity $V^t_e$ therefore comes to be discontinuous at the time when a velocity initial value $V^0$ is renewed.

In the present embodiment, a corrected past velocity $V^{t(i)}_{co}$ is obtained by correcting a pre-correction past estimated velocity $V^{t(i)}_e$ by using the expression (14). As shown in FIG. 4, the corrected past velocities $V^{t(i)}_{co}$ have continuity with an estimated velocity $V^t_e$ on and after $t(0)$. Since the actual velocity variation of a vehicle has a continuity, it can be said that a corrected past velocities $V^{t(i)}_{co}$ calculated by using the expression (14) are closer to true velocities than pre-correction past estimated velocities $V^{t(i)}_e$.

When the past velocity correction unit 142 calculates corrected past velocities $V^{t(i)}_{co}$, the travel distance correction unit 143 recalculates an estimated travel distance by using the corrected past velocities $V^{t(i)}_{co}$ in place of estimated velocities $V^t_e$ in the same way as the travel distance calculation unit 141. The estimated travel distance is defined as a corrected travel distance $L^{t(i)}_{co}$.

When the current position calculation unit 112 calculates a current position $(X_v, Y_v, Z_v)$ of a vehicle from the expression (5) by using a GPS radio wave the signal quality of which is judged to be good by the signal quality judgment unit 120, the position determination unit 144 determines the current position $(X_v, Y_v, Z_v)$ calculated by the current position calculation unit 112 as a current position after renewal.

When the current position $(X_v, Y_v, Z_v)$ calculated by the current position calculation unit 112 is not determined as a current position after renewal, a current position $(X_v, Y_v, Z_v)$ is calculated successively by using a travel distance $L^t_e$ calculated by the travel distance calculation unit 141 and an estimated orientation $\theta^t_e$ determined successively by the estimated orientation determination unit 130.

Concretely, a current position $(X_v^{t(0)}, Y_v^{t(0)})$ at the present time $t(0)$ is calculated from a current position $(X_v^{t(-1)}, Y_v^{t(-1)})$ previous time, an estimated travel distance $L^{t(0)}_e$ this time, and an estimated orientation $\theta^{t(0)}_e$ this time by using the following expressions (15) and (16). Here, it is a matter of course that the current position $(X_v^{t(0)}, Y_v^{t(0)})$ is also a relative position to the current position $(X_v^{t(-1)}, Y_v^{t(-1)})$ previous time.

$$X_v^{t(0)} = X_v^{t(-1)} + L^{t(0)}_e \times \cos \theta^{t(0)}_e \qquad (15)$$

$$Y_v^{t(0)} = Y_v^{t(-1)} + L^{t(0)}_e \times \sin \theta^{t(0)}_e \qquad (16)$$

Further, when the travel distance correction unit 143 calculates a corrected travel distance $L^t_{co}$, the position determination unit 144 corrects the current position $(X_v^{t(0)}, Y_v^{t(0)})$ by successively correcting positions $(X_v^{t(i)}, Y_v^{t(i)})$ after the time $T(N)$ when a velocity initial value $V^0$ was renewed previous time until the time $t(0)$ when a velocity initial value $V^0$ is renewed this time.

$$X_v^{t(i)} = X_v^{t(i-1)} + L^{t(i)}_e \times \cos \theta^{t(i)}_e \qquad (17)$$

$$Y_v^{t(i)} = Y_v^{t(i-1)} + L^{t(i)}_e \times \sin \theta^{t(i)}_e \qquad (18)$$

<Flow of Processing by Control Unit 100>

Figure 5:
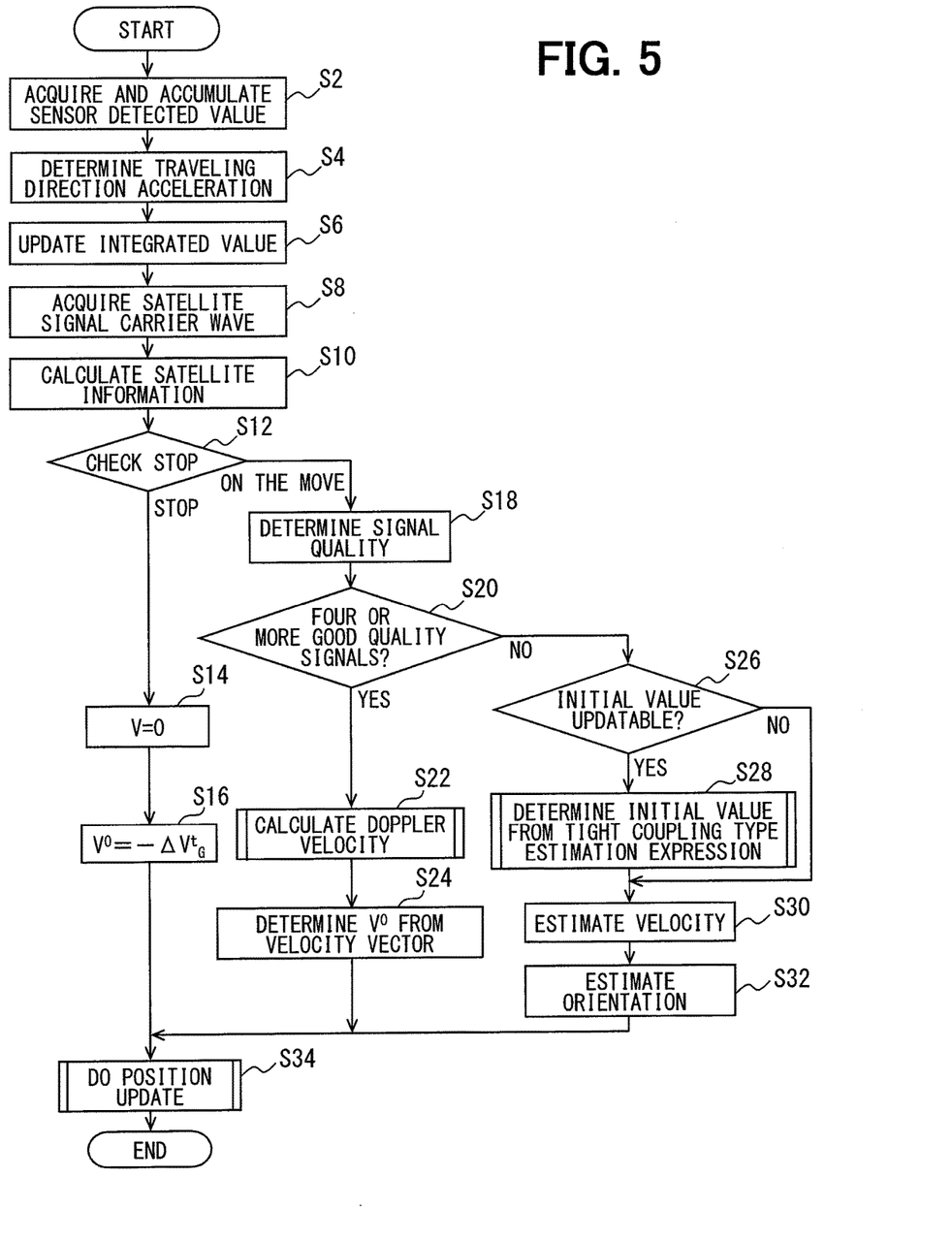
FIG. 5 is a flowchart showing the flow of processing carried out by a control unit in FIG. 1.

An example of flow of processing by a control unit 100 is hereunder explained in reference to the flowcharts in FIGS. 5 to 8. The processing of the flowchart shown in FIG. 5 is carried out repeatedly in a cycle of acquiring a value of a sensor. Here, each of the parameters means a value at a latest time period, namely time period t=0, unless otherwise specified.

In FIG. 5, values detected by the acceleration sensor 20 and the yaw rate sensor 30 are obtained and stored in a memory unit such as a RAM at Step S2. The processing is carried out by the integration processing unit 104 for example.

Step S4 is the processing carried out by the traveling direction acceleration determination unit 102 and a traveling direction acceleration is determined from a detected value of the acceleration sensor 20 acquired at Step S2.

Step S6 is the processing carried out by the integration processing unit 104 and a relative azimuth $\theta^t_{gyro}$ is renewed by adding a detected value of the yaw rate sensor 30 acquired at Step S2 to the last relative azimuth $\theta^{t(-1)}_{gyro}$. Further, an acceleration integrated value $\Delta V^t_G$ is renewed by adding a traveling direction acceleration determined at Step S2 to the last acceleration integrated value $\Delta V^{t(-1)}_G$.

Steps S8 and S10 are the processing carried out by the satellite information acquisition unit 106. At Step S8, a GPS signal and a carrier wave are acquired from the GPS signal reception unit 10. At Step S10, a positional coordinate $(X_{si}, Y_{si}, Z_{si})$, a pseudo distance $\rho_i$, and a Doppler shift amount $D_i$ of a GPS satellite i are calculated from the GPS signal and the carrier wave acquired at Step S8.

Step S12 is the processing by the stop judgment unit 122 and whether or not a vehicle stops is judged from a detected value on the z axis of the acceleration sensor 20 obtained at Step S2, for example. The processing advances to Step S14 when the vehicle is judged to stop and to Step S18 when the vehicle is judged to be moving.

Step S14 is also the processing by the stop judgment unit 122 and a velocity vector is set at (0, 0, 0). Needless to say, a velocity is also 0.

Step S16 is the processing by the initial setting value determination unit 126 and a velocity initial value $V^0$ is set at the latest acceleration integrated value $-\Delta V^t{}_G$. After Step S16 is carried out, position renewal processing at Step S34 is carried out. The position renewal processing at Step S34 is described later.

Step S18 that is carried out when a vehicle is judged to be moving at Step S12 is the processing by the signal quality judgment unit 120 and whether or not the signal quality of a GPS signal is good is judged based on the aforementioned judgment condition. The judgment of the signal quality is applied to all of the acquired GPS signals.

Step S20 is the processing by the velocity vector calculation unit 118 and whether or not the number of GPS signals the signal qualities of which are judged to be good at Step S18 is four or more is judged. When the number is four or more, the processing advances to Step S22.

At Step S22, a Doppler velocity is calculated. The Doppler velocity means a velocity vector (Vx, Vy, Vz) calculated by the velocity vector calculation unit 118 or the magnitude of the velocity vector. The velocity vector (Vx, Vy, Vz) is calculated by using a Doppler shift amount D and hence is called a Doppler velocity here.

Figure 6:
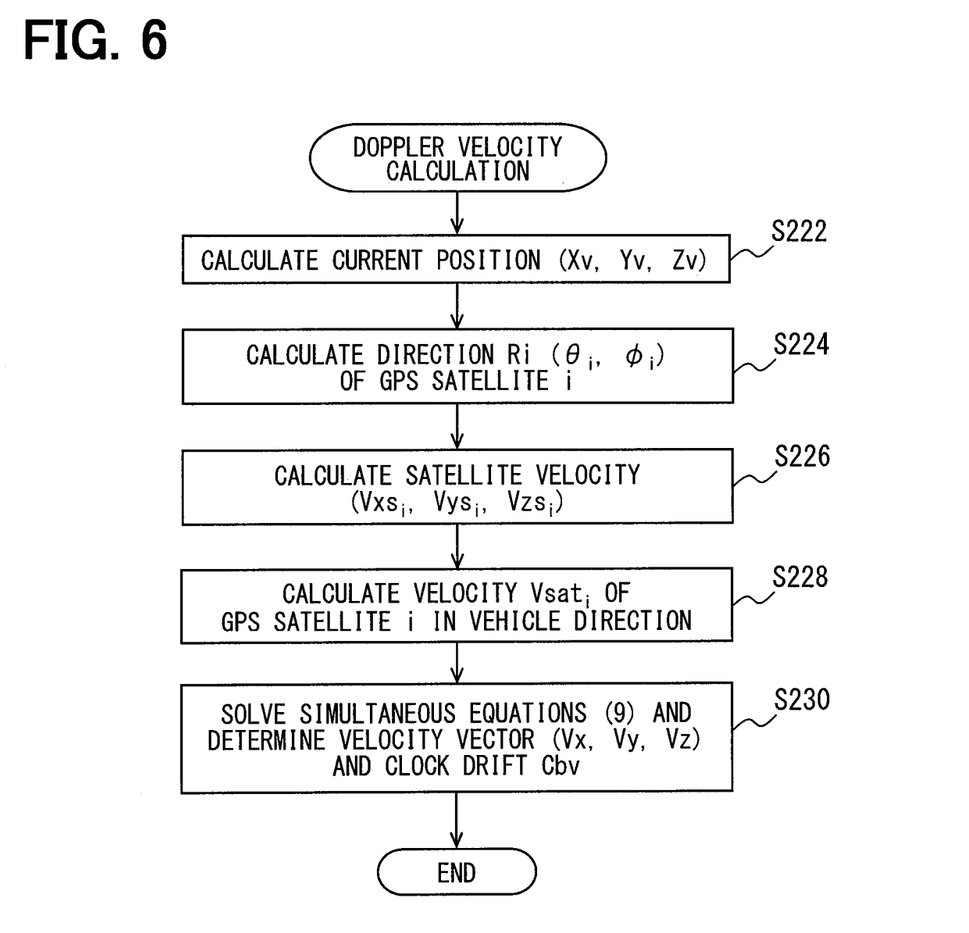
FIG. 6 is a detailed flowchart of Step S22 in FIG. 5.

The detailed processing at Step S22 is shown in FIG. 6. In FIG. 6, Step S222 is the processing by the current position calculation unit 112 and a current position $(X_v, Y_v, Z_v)$ of a vehicle is calculated from a pseudo distance $\rho_i$ and a positional coordinate $(X_{si}, Y_{si}, Z_{si})$ of a GPS satellite i calculated at Step S10.

Step S224 is the processing carried out by the satellite direction calculation unit 114 and a direction $R_i$ $(\theta_i, \phi_i)$ to a GPS satellite i is calculated from a current position $(X_v, Y_v, Z_v)$ of a vehicle calculated at Step S222 and a positional coordinate $(X_{si}, Y_{si}, Z_{si})$ of the GPS satellite calculated at Step S10.

Step S226 is the processing carried out by the satellite velocity calculation unit 110 and a velocity vector $(Vxs_i, Vys_i, Vzs_i)$ of a GPS satellite i is calculated from the time-series data of a positional coordinate $(X_{si}, Y_{si}, Z_{si})$ of the GPS satellite i calculated at Step S10.

Steps S228 and S230 are the processing by the velocity vector calculation unit 118. At Step S228, a velocity $Vsat_i$ of a GPS satellite i in the vehicle direction is obtained from a direction $R_i$ to the GPS satellite i calculated at Step S224 and a velocity vector $(Vxs_i, Vys_i, Vzs_i)$ of the GPS satellite i calculated at Step S226 by $Vsat_i = [Vxs_i, Vys_i, Vzs_i]^T$.

At Step S230, four or more simultaneous equations shown by the expression (9) are formed and the simultaneous equations are solved. As a result, a velocity vector (Vx, Vy, Vz) of a vehicle and a clock drift $Cbv^t$ can be obtained.

Let's return to the explanation on FIG. 5. Step S24 is the processing by the initial setting value determination unit 126 and a velocity initial value $V^0$ is determined from a velocity vector (Vx, Vy, Vz) of a vehicle calculated at Step S22 by the expression (10). When Step S24 is carried out too, the position renewal processing at Step S34 is carried out. Before Step S34 is explained, Step S26 and succeeding steps are explained.

When the number of the signals having good qualities is judged to be three or less at Step S20, the processing advances to Step S26. Step S26 is the processing by the initial setting value determination unit 126 and whether or not an initial value can be renewed is judged. The judgment means concretely that whether or not four or more expressions (12) can be formed by using GPS signals after a velocity initial value $V^0$ is renewed is judged. When the judgment is NO, the processing advances to Step S30 and, when the judgment is YES, the processing advances to Step S28.

At Step S28, a velocity initial value $V^0$ and an orientation initial value $\theta^0$ are determined by using a tight coupling type estimation expression. The tight coupling type estimation expression is concretely the expression (12).

Figure 7:
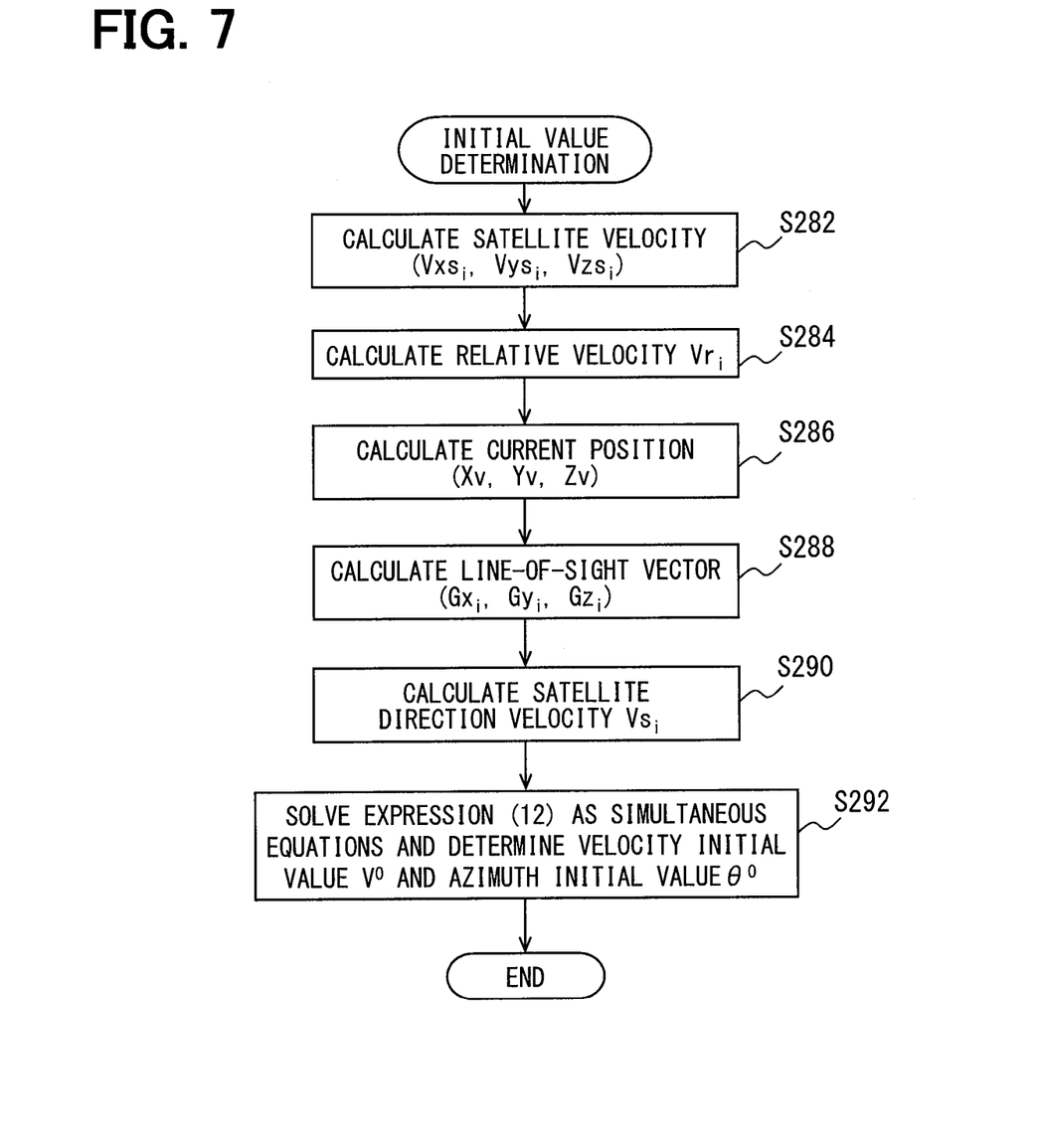
FIG. 7 is a detailed flowchart of Step S28 in FIG. 5.

The detailed processing at Step S28 is shown in FIG. 7. In FIG. 7, Step S282 is the processing carried out by the satellite velocity calculation unit 110 and a velocity vector $(Vxs_i, Vys_i, Vzs_i)$ of a GPS satellite i is calculated from the time-series data of a positional coordinate $(X_{si}, Y_{si}, Z_{si})$ of the GPS satellite i calculated at Step S10.

Step S284 is the processing carried out by the relative velocity calculation unit 108 and a relative velocity $Vr_i$ of a vehicle to a GPS satellite i is calculated by substituting a Doppler shift amount $D_i$ calculated at Step S10 into the aforementioned expression (2).

Step S286 is the processing by the current position calculation unit 112 and a current position $(X_v, Y_v, Z_v)$ of a vehicle is calculated from a pseudo distance $\rho_i$ and a positional coordinate $(X_{si}, Y_{si}, Z_{si})$ of a GPS satellite i calculated at Step S10.

Step S288 is the processing carried out by the line-of-sight vector calculation unit 113. At Step S288, a line-of-sight vector $(Gx_i, Gy_i, Gz_i)$ is calculated by substituting a pseudo distance $\rho_i$ and a positional coordinate $(X_{si}, Y_{si}, Z_{si})$ of a GPS satellite i calculated at Step S10 and a current position $(X_v, Y_v, Z_v)$ of a vehicle calculated at Step S286 into the aforementioned expression (6).

Step S290 is the processing carried out by the satellite direction velocity calculation unit 116. At Step S290, a satellite direction velocity $Vs_i$ of a vehicle in the direction to a GPS satellite i is calculated by substituting a relative velocity $Vr_i$ calculated at Step S284, a line-of-sight vector $(Gx_i, Gy_i, Gz_i)$ calculated at Step S288, and a velocity vector $(Vxs_i, Vys_i, Vzs_i)$ of the GPS satellite i calculated at Step S282 into the aforementioned expression (7).

Step S292 is the processing carried out by the initial setting value determination unit 126. At Step S292, four or more expressions are formed by substituting a satellite direction velocity $Vs_i$ calculated at Step S290, an acceleration integrated value $\Delta V_G$ renewed at Step S6, a relative azimuth $\theta_{gyro}$, and a line-of-sight vector $(Vxs_i, Vys_i, Vzs_i)$ calculated at Step S288 into the aforementioned expression (12). Then the simultaneous equations comprising the four or more expressions are solved. As a result, a velocity initial value $V^0$ and an orientation initial value $\theta^0$ which are the unknown parameters in the expression (12) can be obtained simultaneously.

Let's return to the explanation on FIG. 5. When Step S28 is carried out or when the judgment at Step S26 is NO, Step S30 is carried out. Step S30 is the processing carried out by the estimated velocity determination unit 128 and an estimated velocity $V_e$ is calculated from the latest velocity initial value $V^0$ and an acceleration integrated value $\Delta V_G$ renewed at Step S6.

As shown in FIG. 5, when a velocity initial value $V^0$ is renewed but an acceleration integrated value $\Delta V_G$ is not reset, an estimated velocity $V_e$ is calculated by adding the velocity initial value $V^0$ to the acceleration integrated value $\Delta V_G$. When a velocity initial value $V^0$ is renewed and an acceleration integrated value $\Delta V_G$ is reset, an estimated velocity $V_e$ is calculated by adding the acceleration integrated value $\Delta V_G$ to the velocity initial value $V^0$.

Step S32 is the processing carried out by the estimated orientation determination unit 130 and an estimated orientation $\theta_e$ is calculated from the latest orientation initial value $\theta^0$ and a relative azimuth $\theta_{gyro}$ renewed at Step S6. The concrete calculation method of an estimated orientation $\theta_e$ is the same as the case of replacing a velocity initial value $V^0$ with an orientation initial value $\theta^0$ and replacing an acceleration integrated value $\Delta V_G$ with a relative azimuth $\theta_{gyro}$ in a method of calculating an estimated velocity $V_e$ from the velocity initial value $V^0$ and the acceleration integrated value $\Delta V_G$. When Step S32 is carried out too, the position renewal processing at Step S34 is carried out. Step S34 is carried out by the position renewal unit 140.

Figure 8:
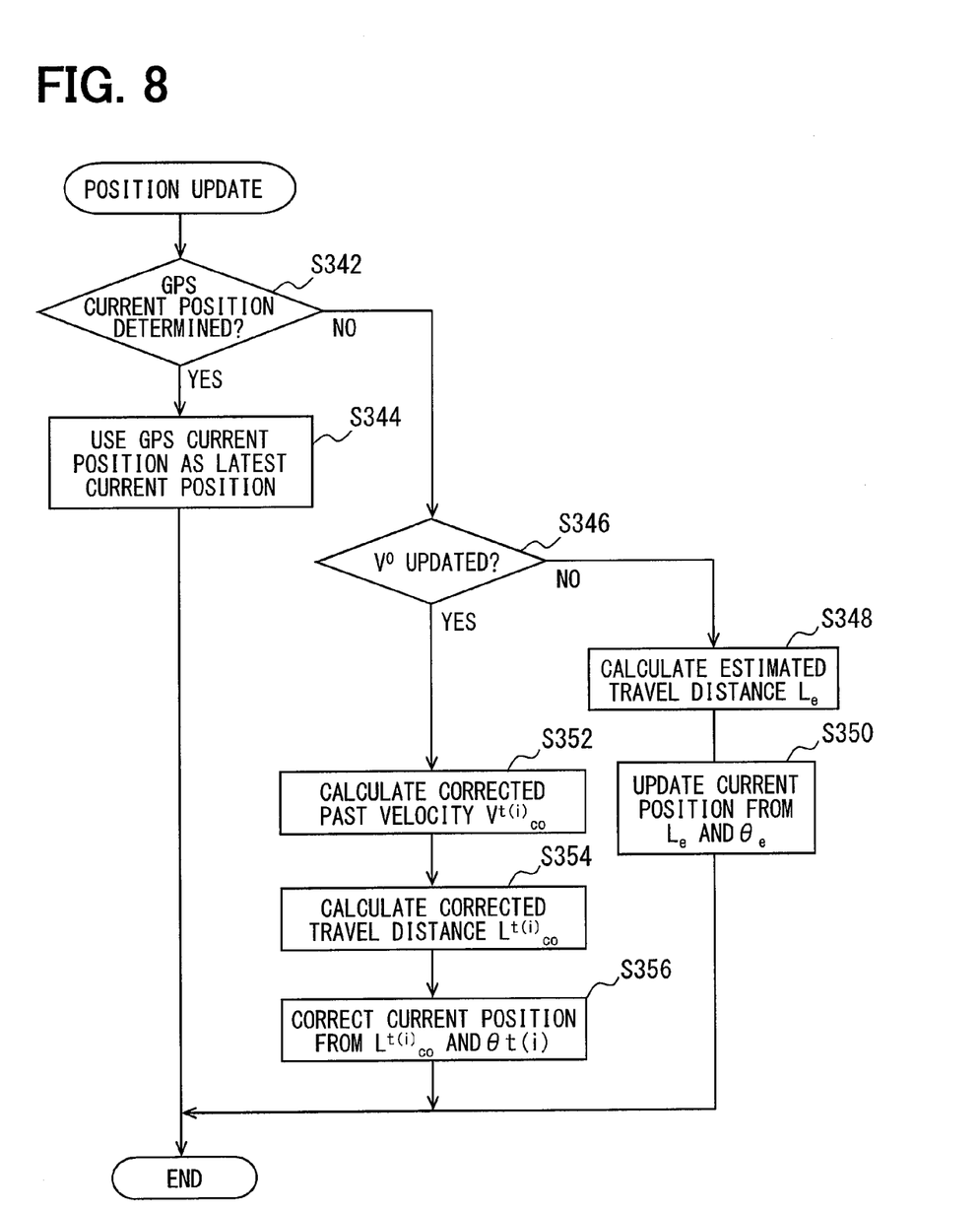
FIG. 8 is a detailed flowchart of Step S34 in FIG. 5.

The detailed processing of Step S34 is shown in FIG. 8. Here in FIG. 8, Step S348 is carried out by the travel distance calculation unit 141, Step S352 is carried out by the past velocity correction unit 142, and Step S354 is carried out by the travel distance correction unit 143. Other steps are carried out by the position determination unit 144.

At Step S342, whether or not a GPS current position is determined is judged. The GPS current position means a current position $(X_v, Y_v, Z_v)$ calculated by the current position calculation unit 112 from the expression (5) by using a GPS radio wave the signal quality of which is judged as good by the signal quality judgment unit 120. When the judgment is YES, the processing advances to Step S344. At Step S344, the GPS current position $(X_v, Y_v, Z_v)$ is used as the latest current position.

When the judgment at Step S342 is NO, the processing advances to Step S346. At Step S346, whether or not the velocity initial value $V^0$ is renewed is judged. When any one of Steps S16, S24, and S28 of FIG. 5 is carried out, the judgment at Step S346 is YES. In contrast, when the judgment at Step S26 of FIG. 5 is NO, the judgment at Step S346 is also NO. When the judgment at Step S346 is NO, the processing advances to Step S348.

At Step S348, an estimated travel distance $L_e$ is calculated by multiplying an estimated velocity $V_e$ calculated at Step S30 by an acceleration acquisition cycle. At Step S350, a latest current position $(X_v, Y_v)$ is calculated by using the estimated travel distance $L_e$ calculated at Step S348, an estimated orientation $\theta_e$ estimated at Step S32, the expression 15, and the expression 16. Here, a value on the z coordinate is regarded as unchanged.

At Step S352 that is carried out when the judgment at Step S346 is YES, a corrected past velocity $V^{t(i)}_{co}$ is calculated by correcting an estimated velocity $V^t_e$ after a time point t(N) when a velocity initial value $V^0$ is renewed previous time until a time point t(0) when a velocity initial value $V^0$ is renewed this time, namely a pre-correction past estimated velocity $V^{t(i)}_e$, with the expression (14).

At Step S354, a corrected travel distance $L^{t(i)}_{co}$ is calculated by multiplying the corrected past velocity $V^{t(i)}_{co}$ calculated at Step S352 by an acceleration acquisition cycle.

At Step S356, a current position $(X_v, Y_v)$ is recalculated by using the corrected travel distance $L^{t(i)}_{co}$ calculated at Step S354, an estimated orientation $\theta^{t(i)}_e$ estimated at Step S32, the expression 17, and the expression 18. Here, a value on the z coordinate is regarded as unchanged.

<Technical of Embodiment>

In the present embodiment, when a Doppler velocity is calculated (S22), the Doppler velocity is used as a velocity initial value $V^0$ (S24) and, when the velocity of a vehicle is 0 km/h (S14), the velocity is used as a velocity initial value $V^0$ (S16). Further, when the expression (12), which is a tight coupling type estimation expression, can be solved, a velocity at the initial time obtained from the expression (12) is used as a velocity initial value $V^0$ (S28). A velocity initial value $V^0$ determined by any one of such methods has a good accuracy.

Then an estimated velocity $V_e$ is estimated by using the velocity initial value $V^0$ determined in this way and an acceleration integrated value $\Delta V_G$ (S30). After the velocity initial value $V^0$ is renewed therefore, the accuracy of an estimated velocity $V_e$ that has deteriorated due to the cumulative error of the acceleration integrated value $\Delta V_G$ improves.

In the present embodiment in addition, when a velocity initial value $V^0$ is determined, a corrected past velocity $V^{t(i)}_{co}$ is obtained by correcting a pre-correction past estimated velocity $V^{t(i)}_e$ which is an estimated velocity $V_e$ after a time point t(N) when a velocity initial value $V^0$ is renewed previous time until a time point t(0) when a velocity initial value $V^0$ is renewed this time, so that the corrected past velocity $V^{t(i)}_{co}$ is continuous with the velocity initial value $V^0$ renewed this time (S352). As a result, the accuracy of a past estimated velocity $V_e$, which has deteriorated due to the cumulative error of the acceleration integrated value $\Delta V_G$, also improves. Then when the corrected past velocity $V^{t(i)}_{co}$ is determined, a corrected travel distance $L^{t(i)}_{co}$ obtained by recalculating an estimated travel distance after a velocity initial value $V^0$ is renewed previous time until a velocity initial value $V^0$ is renewed this time by using the corrected past velocity $V^{t(i)}_{co}$ is determined (S354). As a result, the accuracy of an estimated travel distance, which has deteriorated due to the accuracy drop of a past estimated velocity $V_e$, also improves.

In the present embodiment further, when a corrected travel distance $L^{t(i)}$ is calculated, a current position is corrected by using the corrected travel distance $L^{t(i)}$ (S356). As a result, even in a situation of continuing the circumstance of not being able to determine a GPS current position, it is possible to continue to determine a current position with a high degree of accuracy.

In addition to, upon renewing a velocity initial value $V^0$, correcting a current position by correcting a pre-correction past estimated velocity $V^{t(i)}_e$ which is a past estimated velocity, the following technical effects can be obtained in the present embodiment.

A satellite direction velocity $Vs_i$ of a vehicle can be calculated based on a line-of-sight vector (Gx, Gy, Gz) from the vehicle to a GPS satellite i, a velocity vector (Vx, Vy, Vz) of the vehicle, and a clock drift Cbv as shown in the expression (13).

In the present embodiment, in the expression (13), the x component and y component of a velocity vector are constrained by a velocity of a vehicle and the time variation of an azimuth in the traveling direction of the vehicle, namely a relative azimuth $\theta_{gyro}$ (constraint condition 1). The initial setting value determination unit 126 determines a velocity initial value $V^0$ by using the expression (12) thus obtained.

Since the expression (12) is constrained by the condition related to time variation in this way, simultaneous equations can comprise the expressions (12) using GPS signals at a plurality of different observation points. Unknown parameters other than a velocity initial value $V^0$ exist in the expression (12) and hence the simultaneous equations have to comprise the number of the expressions (12) corresponding to the number of the unknown parameters. In the present embodiment however, since the simultaneous equations can comprise the expressions (12) using GPS signals at a plurality of different observation points, simultaneous equations comprising the expressions (12) of the number allowing the unknown parameters to be solved are likely to be formed.

The initial setting value determination unit 126 therefore can obtain a velocity initial value $V^0$ with a high frequency. Then by renewing the velocity initial value $V^0$ with a high frequency, the frequency of removing the influence of drift from a value detected by the acceleration sensor 20 increases and hence the estimation accuracy of an estimated velocity $V_e$ calculated from an acceleration integrated value $\Delta V_G$ and a velocity initial value $V^0$ improves. As a result, the accuracy of a current position determined by using the estimated velocity $V_e$ also improves.

Further, in the present embodiment, in addition to the constraint condition 1, the expression (12) is derived by using the constraint condition 3 that the time variation of a clock drift is linear. The number of unknown parameters in the expression (12) can therefore be reduced. As a result, the simultaneous equations of the number allowing the unknown parameters to be solved are likely to be formed and hence the frequency of renewing a velocity initial value $V^0$ can be increased further.

Further, the expression (12) includes the terms of a velocity initial value $V^0$ and an acceleration integrated value $\Delta V_G$ in the term of a velocity of a vehicle. By solving the simultaneous equations comprising the expressions (12) of the number corresponding to the number of the unknown parameters therefore, a velocity initial value $V^0$ can be obtained directly.

Further, in the present embodiment, the velocity vector calculation unit 118, which calculates a velocity vector (Vx, Vy, Vz) without using an acceleration integrated value $\Delta V_G$, is provided. When the velocity vector calculation unit 118 calculates a velocity vector (Vx, Vy, Vz), a velocity initial value $V^0$ is determined by using the velocity vector (Vx, Vy, Vz) calculated by the velocity vector calculation unit 118 (S24). The accuracy of a velocity vector (Vx, Vy, Vz) calculated by the velocity vector calculation unit 118 is good and hence the accuracy of a velocity initial value $V^0$ improves accordingly.

Further, in the present embodiment, when the stop judgment unit 122 judges that a vehicle stops, the velocity of the vehicle is regarded as zero and a velocity initial value $V^0$ is determined (S16). The accuracy of the velocity initial value $V^0$ hereby improves. Then as a result of improving the accuracy of the velocity initial value $V^0$, the accuracy of an estimated velocity Ve calculated from the velocity initial value $V^0$ and an acceleration integrated value $\Delta V_G$ also improves.

Although the embodiment has heretofore been exemplified, the embodiment is not limited to the embodiment described above, the following modifications are also included in the embodiment, and the embodiment can further be modified variously within the range not deviating from the tenor, in addition to the following modifications.

<First Modification>

Although a clock drift is constrained by the condition that the time variation is linear, namely the constraint condition 3, in the above embodiment, the constraint condition 3 may be omitted. When the constraint condition 3 is omitted, $Cbv^0+At$ in the expression (12) is replaced with $Cbv^t$ that is an unknown parameter.

<Second Modification>

Further, it is also possible to keep the constraint condition 3 and omit the constraint by the time variation of an azimuth in the constraint condition 1. On this occasion, the constraint condition 1 is the condition that the magnitude of a velocity vector is constrained only by the velocity of a vehicle and $\theta^t_{gyro}$ in the expression (12) is an unknown parameter.

<Third Modification>

Although a GPS is used as a satellite positioning system in the above embodiment, another satellite positioning system may also be used. Further, both a satellite included in a GPS and a satellite included in another satellite positioning system may be used.

<Fourth Modification>

Although a movable object is a vehicle in the above embodiment, a travel distance estimation device can be applied also to a movable object other than a vehicle.

What is claimed is:

1. A travel distance estimation device comprising:
   an acceleration sensor mounted on a vehicle that detects a traveling direction acceleration of the vehicle, the traveling direction acceleration indicating an acceleration of the vehicle in an anteroposterior direction of the vehicle;
   a Global Positioning System (GPS) signal receiver mounted on the vehicle that receives a GPS signal from a GPS satellite of a GPS satellite positioning system;
   a controller connected to the acceleration sensor and the GPS signal receiver, mounted on the vehicle, and having a processor configured to:
   determine a plurality of traveling direction accelerations over a time period, based on output from the acceleration sensor;
   calculate an acceleration integrated value by integrating the plurality of traveling direction accelerations determined by the processor over the time period;
   calculate a velocity initial value of the vehicle based on a Doppler shift amount of the GPS signal received by the GPS signal receiver from the GPS satellite of the GPS satellite positioning system or a velocity of the vehicle at a time of stoppage of the vehicle;
   calculate an estimated velocity of the vehicle based on the acceleration integrated value calculated by the processor and the velocity initial value calculated by the processor;
   calculate an estimated travel distance of the vehicle based on the estimated velocity calculated by the processor and a predetermined time;
   calculate, upon calculating the velocity initial value, a plurality of corrected past velocities by correcting a plurality of past estimated velocities, the plurality of corrected past velocities being calculated as continuous with the calculated velocity initial value, the plurality of past estimated velocities being previously determined by the processor during the time period, the time period being from when a previous velocity initial value was previously determined by the processor until the velocity initial value is determined by the processor;
   recalculate, upon determining the plurality of corrected past velocities by the processor, based on the plurality of corrected past velocities and the time period, an estimated travel distance during the time period; and
   estimate a traveling trajectory of the vehicle based on the estimated travel distance during the time period.

2. The travel distance estimation device according to claim 1, the processor being further configured to:
   determine a traveling orientation of the vehicle; and
   determine, based on the estimated travel distance and the traveling orientation a relative position of the vehicle that is relative to a previous position of the movable object determined at the start of the time period, wherein
upon recalculating the estimated travel distance, the processor is further configured to recalculate, based on the recalculated estimated travel distance and the traveling orientation, the relative position of the vehicle after the previous velocity initial value was determined by the processor until the velocity initial value is determined by the processor.

3. The travel distance estimation device according to claim 1, wherein the processor is further configured to:
determine the plurality of corrected past velocities based on an assumption of a liner increase in errors of the plurality of past estimated velocities prior to the correcting, by correcting each of the plurality of past estimated velocities with a correction amount obtained by multiplying a difference between the velocity initial value and a latest pre-correction past estimated velocity by a coefficient corresponding to the time period.

4. The travel distance estimation device according to claim 1, wherein processor is further configured to:
calculate the acceleration integrated value and successively calculate a relative azimuth relative to the traveling direction at a base point of time by integrating a yaw rate detected by a yaw rate sensor, the yaw rate sensor detecting the yaw rate of the movable object;
calculate a satellite direction velocity based on the Doppler shift amount of the GPS signal received by the GPS signal receiver from the GPS satellite, the satellite direction velocity being a component of a velocity of the vehicle in the direction to the satellite;
calculate a line-of-sight vector from the vehicle to the satellite based on the GPS signal,
determine, as the velocity initial value, the velocity of the vehicle calculated based on the Doppler shift amount of the GPS signal received by the GPS signal receiver from the GPS satellite of the GPS satellite positioning system,
determine the velocity initial value based on:
a velocity estimation expression showing a relationship among the satellite direction velocity, the line-of-sight vector, the velocity of the vehicle, and a traveling orientation of the vehicle;
the calculated satellite direction velocity;
the calculated line-of-sight vector; and
the calculated relative azimuth, and
wherein, in an expression showing the relationship among the satellite direction velocity, the line-of-sight vector, and a velocity vector of the vehicle in the velocity estimation expression, a magnitude of the velocity vector is constrained by the velocity of the vehicle and a time variation of a direction of the velocity vector is constrained by a time variation of the azimuth of the velocity in the traveling direction.

5. The travel distance estimation device according to claim 1, the processor being further configured to:
calculate a satellite direction velocity based on the Doppler shift amount of the GPS signal received by the GPS signal receiver from the GPS satellite, the satellite direction velocity being a component of a velocity of the vehicle in the direction to the satellite; and
calculate a line-of-sight vector from the vehicle to the satellite based on the satellite signal,
determine, as the velocity initial value, the velocity of the vehicle calculated based on the Doppler shift amount of the GPS signal received by the GPS signal receiver from the GPS satellite of the GPS satellite positioning system,
determine the velocity initial value of the vehicle based on:
a velocity estimation expression showing a relationship among the satellite direction velocity, the line-of-sight vector, the velocity of the vehicle, a traveling orientation of the vehicle, and a clock drift;
the calculated satellite direction velocity; and
the calculated line-of-sight, and
wherein, in an expression showing the relationship among the satellite direction velocity, the line-of-sight vector, a velocity vector of the velocity, and the clock drift in the velocity estimation expression, a magnitude of the velocity vector is constrained by the velocity of the vehicle and the clock drift is constrained by a constraint condition that a time variation of the clock drift is linear.

6. The travel distance estimation device according to claim 4, wherein
the velocity estimation expression includes a clock drift in addition to the satellite direction velocity, the line-of-sight vector, the velocity of the vehicle, and the traveling orientation of the vehicle.

7. The travel distance estimation device according to claim 6, wherein
the velocity estimation expression is further constrained by a condition that a time variation of the clock drift is linear.

8. The travel distance estimation device according to claim 4, wherein:
the velocity estimation expression includes a term of the initial velocity value and a term of the acceleration integrated value as a term of the velocity of the vehicle; and
when determining the velocity initial value by using the velocity estimation expression, the processor is further configured to determine the velocity initial value based on the calculated acceleration integrated value in addition to the velocity estimation expression, the calculated satellite direction velocity, and the calculated line-of-sight vector.

* * * * *